United States Patent [19]

Jennings et al.

[11] Patent Number: 4,754,813
[45] Date of Patent: Jul. 5, 1988

[54] TREE CAPLESS CONE SEAL MANIFOLD

[75] Inventors: Charles E. Jennings, Thousand Oaks; Jon E. Hed; Jeffrey D. Otten, both of Ventura, all of Calif.; Lee A. Gillette, Rio de Janeiro, Brazil; Bruno T. Schauerte, Rio de Janeiro, Brazil; Christian G. Marius, Rio de Janeiro, Brazil

[73] Assignee: Vetco Gray Inc, Houston, Tex.

[21] Appl. No.: 941,260

[22] Filed: Mar. 27, 1987

[51] Int. Cl.⁴ ............................................. E21B 34/04
[52] U.S. Cl. ..................................... 166/344; 166/360; 166/368; 166/332; 137/607
[58] Field of Search ............... 166/368, 332, 344, 345, 166/351, 360; 137/602, 605, 606, 607

[56] References Cited

U.S. PATENT DOCUMENTS

| | | | |
|---|---|---|---|
| 3,576,194 | 4/1971 | Christensen | 137/607 |
| 3,820,600 | 6/1974 | Baugh | 166/344 |
| 4,460,156 | 7/1984 | Hazelrigg et al. | 285/25 |
| 4,497,369 | 2/1985 | Hurta et al. | 251/62 |
| 4,607,701 | 8/1986 | Gundersen | 166/368 |

FOREIGN PATENT DOCUMENTS 0950495 2/1964 United Kingdom ............... 166/66.5

Primary Examiner—Stephen J. Novosad
Assistant Examiner—Terry Lee Melius
Attorney, Agent, or Firm—Joseph R. Dwyer

[57] ABSTRACT

Disclosed is a production tree (10) with a top block (mandrel) (12) of the tree provided with a cone-shaped male connector member (14) which also functions as a manifold, and called a cone seal manifold, by having a plurality of shuttle valves (66) which, in the production mode connect umbilical hydraulic control lines (44) to valve actuator control lines (42). In the workover mode, a running tool (132) having a mating bell-shaped female connector member (134) engages the cone seal manifold (14) and moves the shuttle valves (66) to disconnect the umbilical control lines (44) from the valve actuator control lines (42) and to open the valve actuator control lines (42) to rig hydraulic control lines in the running tool (132) through the mating cone seal surfaces (134,56). Normally closed passageways (112) in the cone (56) of the cone seal manifold (14) are opened by fluid pressure from the rig control lines.

15 Claims, 2 Drawing Sheets

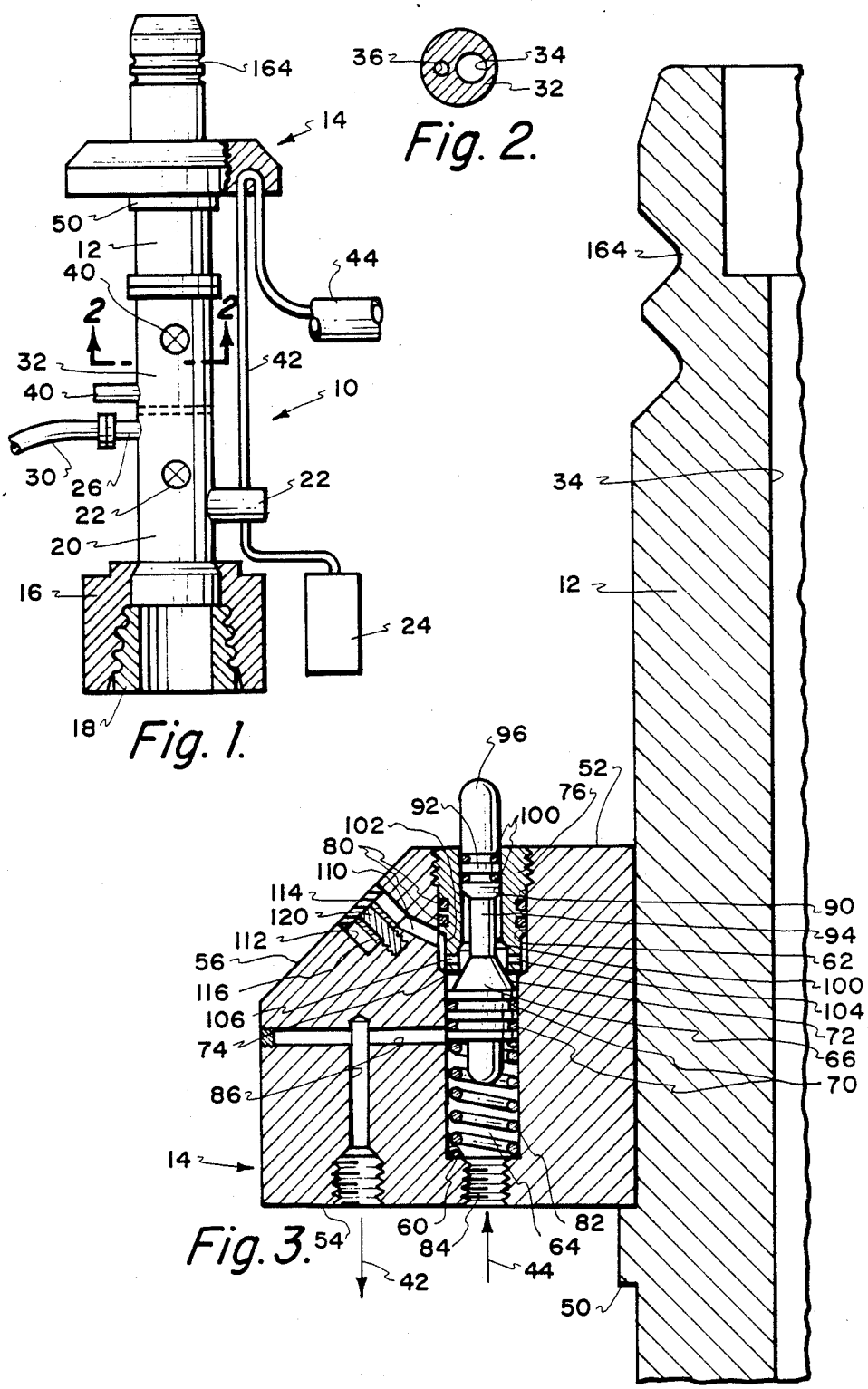

TREE CAPLESS CONE SEAL MANIFOLD

BACKGROUND OF THE INVENTION

1. Field of Invention

This invention is directed to completion, production, or injection trees for producing oil and gas from a subsea well and is specifically directed to cone seal valve means and connector for vertical access to a capless production tree for workover.

2. Prior Art

U.S. Pat. No. 4,607,701 to Gundersen, U.S. Pat. No. 4,497,369 to Hurta et al, U.S. Pat. No. 4,219,223 to Schulte, U.S. Pat. No. 4,460,156, U.S. Pat. No. 3,321,217 to Ahlstone, U.S. Pat. No. 4,440,423 to Pfeifler, U.S. patent application Ser. No. 727,658, filed 04/26/85 by Albert and Dean and U.S. patent application Ser. No. 805,028, filed 12/04/85 by Seehausen.

A typical prior art completion tree is equipped to be locked onto the wellhead of a subsea well and comprises essentially a series of valves and their actuators, for connecting production and other tubing within the well to subsea flowlines which bring the well production to the production platform or to shore. A tree manifold at the top of the tree provides a junction point for all hydraulic control functions and interfaces with a tree cap during production and with a running tool during installation of the tree and re-entry to the well for workover. Both the tree cap and running tool direct the flow of hydraulic fluid (control signals) to various valve actuators, the flowline connector and the wellhead connector, etc. The number of valve actuators in the tree depends upon; the tubing program, whether or not the tree is to be a through flowline (TFL) type, whether or not access to the annulus is to be provided, and whether or not special features are required, such as chemical injection, etc. The Hurta et al Patent discloses a control system through the tree manifold and tree cap as an example thereof.

In this prior art completion tree, it is the tree cap that directs the hydraulic control signals from a bundle of control lines, (umbilical) connected to the tree cap and to various valve operators.

During production, the tree cap, and normally the tree cap protector, are in place on the manifold and production is out the side of the tree to the subsea flowlines.

If re-entry to the well for workover is desired, the running tool is lowered to remove the tree cap protector and tree cap and after bringing them to the surface, is again run and stabbed on the tree manifold to control the tree actuators from the surface to perform whatever work is necessary to the well.

A disadvantage of the prior art system is that when a tree cap is removed from the tree manifold and before the running tool can be landed, sea water intrusion and contamination of control circuits can result. Also, during periods when neither the tree cap nor the running tool are connected to the tree manifold, the completion tree is completely divorced from the surface and is thus out of control. Further, the number of running operations involving costly rig time for workover access to the tree.

This disadvantage was overcome by providing the top block of a tree with valve cartridges mounted on a valve plate, in lieu of a tree cap, to perform the functions of a tree cap and thus eliminate the need for a tree cap in the Gundersen patent.

SUMMARY OF THE INVENTION

This invention comprises a production tree with a top block of the tree provided with a cone-shaped male connector member, which also functions as a manifold, hereinfter called a cone seal manifold, by having a plurality of shuttle valves which, in the production mode, connect umbilical hydraulic control lines to valve actuator control lines. In the workover mode, a running tool having a mating bell-shaped female connector member engages the cone seal manifold and moves the shuttle valves to disconnect the umbilical control lines from the valve actuator control lines and to open the valve actuator control lines to rig hydraulic control lines in the running tool through the mating cone seal surfaces. Normally closed passageways in the cone surface of the cone seal manifold are opened by fluid pressure from the rig control lines.

BRIEF DESCRIPTION OF THE DRAWINGS

FIG. 1 is a simplified schematic illustration of a subsea completion tree locked on a subsea well with the top tree block and cone seal manifold according to this invention enlarged for emphasis;

FIG. 2 is a cross-sectional view of one block of the tree showing the production and annulus bores;

FIG. 3 is an enlarged elevational view in cross-section of the top portion of the tree showing the cone seal manifold in a production mode.

DETAILED DESCRIPTION

Figure 4:
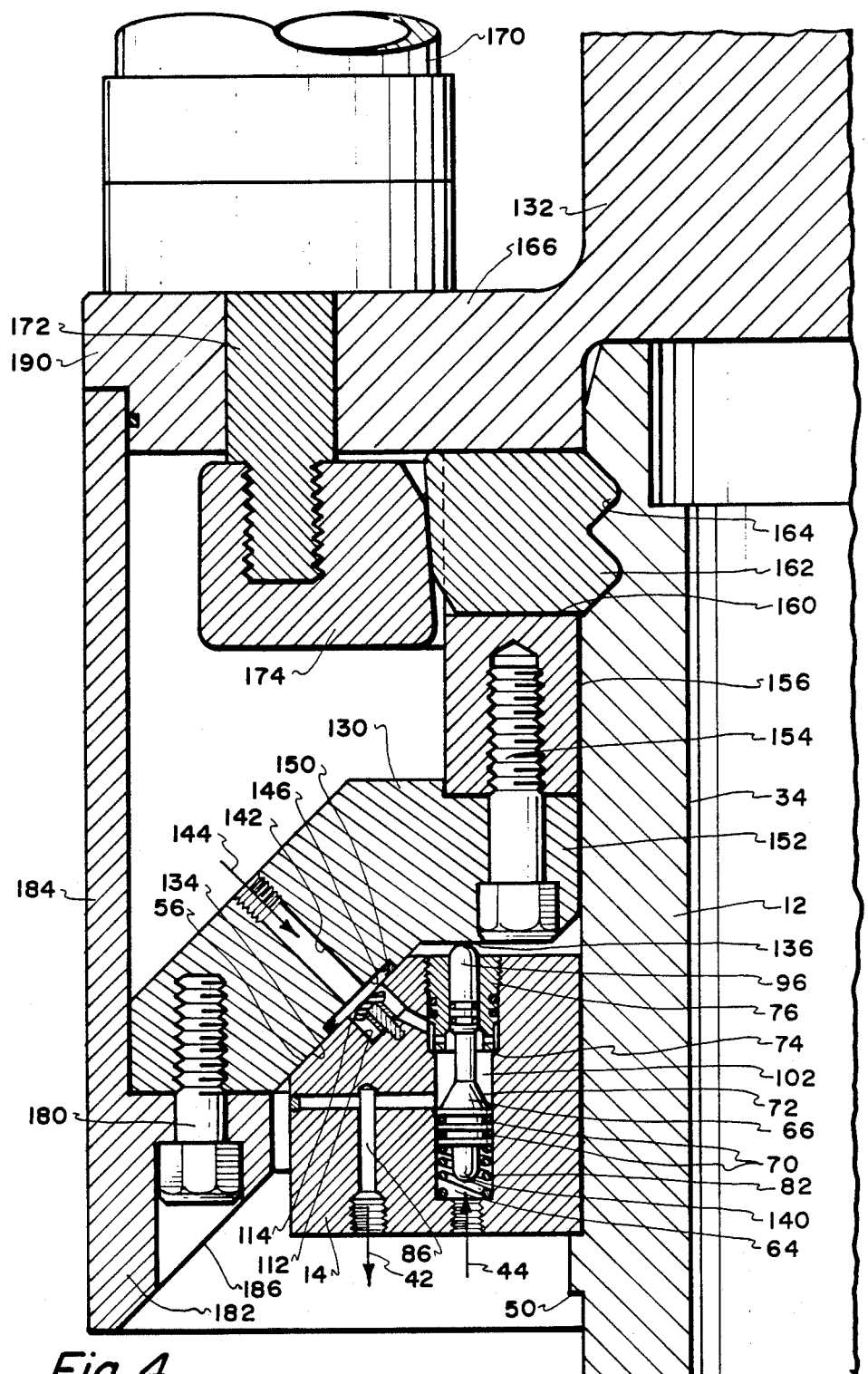
FIG. 4 is a view of the same portion of the tree block with the female mating connector member and cone seal manifold forming a connector for vertical access to the tree for workover purposes.

FIGS. 1 and 2 illustrate schematically an ocean floor completion tree 10 in a well system which is typical except for the top block 12 which incorporates the cone seal manifold 14 of this invention which will be explained later in connection with FIGS. 3 and 4.

The typical portion of the completion tree 10 is usually made up of a hydraulically actuated wellhead connector 16 for connecting the remainder of the tree to a wellhead 18, a master valve block 20 supporting a plurality of production and annulus valves with actuators 22 (two shown) and an exhaust accumulator 24 (one shown). The master valve block 20 is ported as at 26 to connect the master valve block 20 to a flowline 30 for the production flow from the production tubing. Sometimes a swab valve block 32, or a mandrel block, is used and topped by a conventional tree manifold (not shown). The dotted lines in FIG. 1 between the master valve block 20 and the swab valve block 32 illustrates schematically the fact that the swab valve block 32 is not always used. In the production mode, conventionally a tree cap and a tree cap protector are used (neither of which are shown).

As will be apparent, the cone seal manifold 14 of this invention replaces the prior art tree manifold, tree cap and tree cap protector.

Although FIG. 2 shows only the cross-sectional view of the swab valve block 32, all tree blocks are provided with multiple bores; a large production bore 34 for communication with the production tubing in the well, and a small annulus bore 36 for communication with the well annulus. Each block of the tree is also provided with suitable nipples and pockets to connect the bores 34 and 36 of each block for open communication throughout the length of the tree as the blocks are stacked and connected to the wellhead 18. The production and swab valve actuators 22 and 40 control the production bore 34 and annulus bore 36, and among other things, direct production fluid out of a flowline 30 through the port 26 and these valve actuators are connected by control lines 42 (only one shown) conventionally to a tree manifold (not shown).

In the prior art tree, a bundle of control lines (umbilical) 44 which normally are connected to the tree manifold either directly, or through a valve control manifold (not shown) and normally the tree cap directs hydraulic fluid under pressure (control signals) from each of the hydraulic control lines of the umbilical 44 to some of the control lines 42 and hence to various production valve actuators 22.

In the production mode, the function of the conventional tree cap is to direct hydraulic fluid entering one port of the tree manifold out another port of the tree manifold to the control lines. On the other hand, during the workover mode, and after the tree cap and cap protector were removed, the running tool directs hydraulic fluid from the surface (rig) to the various control lines to all valve actuators as well as other hydraulically operated components such as the wellhead connector.

As stated supra, this invention eliminates the need for a tree cap and overcomes the disadvantages in connection therewith and also eliminates the need for plate and valve operators of the Gundersen patent by providing a cone seal manifold 14 which will perform a function of the prior art tree manifold and tree cap and will eliminate the need for a tree cap protector.

Turning now to this enlarged views of FIGS. 3 and 4, it can be seen that the block 12 is a cylindrical mandrel and is provided with a radial ridge 50 to support the cone seal manifold 14 which is in the form of a ring supported on this ridge.

This cone seal manifold 14 has relatively flat top and bottom surfaces 52 and 54 and its radially outside surface is provided with a conical surface forming an upwardly facing cone 56. Radially inwardly of the cone 56, the cone seal manifold is provided with several vertical bores and counterbores, only one bore 60 and counterbore 62 being shown, which form a valve chamber 64 for a shuttle valve 66. The number of such bores will depend on the number of tree control valve actuators to be controlled.

The shuttle valve 66 moves from one position as shown in FIG. 3, to a second position as shown in FIG. 4 and is provided with suitable O-ring seals 70 to prevent leakage in the direction of the counterbore 62. The shuttle valve 66 is also provided with a taper (conical surface) 72 which engages a valve seat 74. The valve seat 74 is formed at one end of the metallic cylindrical insert 76 threaded into counterbore 62 sufficiently to engage the top of the bore 60. The valve taper 72 and valve seat 74 form a metal-to-metal seal for the valve chamber 64. Suitable O-ring seals 80 are provided between the counterbore 62 and the insert 76 to prevent leakage. The valve chamber 64 also contains a helical pressure return spring 82 to bias the shuttle valve 66 in the up position against the valve seat 74. In this position, the valve chamber 64 is open to the flow of fluid from one umbilical line 44 to one valve control line 42. The cone seal manifold 14 is bored and threaded as at 84 and provided with passageways 86 to provide fluid communication between the umbilical line 44 and the valve actuator control line 42. This is the position of the shuttle valve 66 in the production mode.

The insert 76 is also provided with a central bore 90 to receive valve stem 92 of the shuttle valve 66. Stem 92 has a narrow portion 94 between the taper 72 and a head 96; the latter extending above the top surface 52 and the relationship of the head 96 and bore 90 is one of a sliding fit with O-ring seals 100 in the head 96 preventing leakage out the bore 90.

The head 96, valve taper 72 and the narrow portion 94 form a second and annular chamber 102 which is closed when the shuttle valve 66 is in the up position as shown in FIG. 3.

This chamber 102 connects with the cone surface 56 by a pair of bores 104 and a reduced portion 106 on the outer surface of the insert 76 located between the seals 100 and the valve seat 74. This annular chamber 102 is connected by a diagonal passage 110 to a seal chamber 112 in the cone 56 which is closed by a water barrier 114. The water barrier 114 comprises a disk of suitable material, such as rubber, which closely fits against the sidewall of the seal chamber 112 and is held outwardly by a bushing 116 of any suitable material. The head of a bolt 120 is threaded into the base of the seal chamber 112 and prevents the water barrier from moving outwardly yet permits the outward edges of the water barrier 114 to be bent by hydraulic fluid pressure in the workover mode.

Thus, in the production mode, the seal chamber 112 and the annular chamber 102 are sealed against water intrusion and the second chamber 102 is closed to the valve chamber 64 by the shuttle valve 66.

FIG. 4 illustrates the workover mode accomplished by this invention where vertical access can be made to the production and annulus bores 34 and 36.

A bell-shaped female mating connector member 130 is connected to a running tool 132. This bell-shaped female connector member 130 is provided with a downwardly facing cone surface 134 for sealing engagement with the cone surface 56 on the cone seal manifold 14 and is also provided with a horizontal wall surface 136 for engagement with the head 96 of the shuttle valve 66. When the female connector member 130 has landed on the cone seal mandrel 14, the shuttle valve 66 is moved to its lower position unseating the valve taper 72 off the valve seat 74 opening the annular chamber 102 to the passages 86 and valve actuator control lines 42. The shuttle valve 66 has an abutment stem 140 opposite the head 96 to limit downward movement of the shuttle valve 66.

The cone area of the female connector body 130 has a transverse bore 142 which aligns with the seal chamber 112 so that fluid from the rig lines, one represented by arrow 144, may enter the annular chamber 102 and the valve actuator control lines 42 so that the latter may be controlled from the surface (rig). The fluid under pressure in the transverse bore 144 urges the outer edges of the water barrier 114 to bend to allow the fluid to enter the seal chamber 112. The transverse bore 144 opens into a large, relatively shallow, opening 146 which contains a resilient cone seal 150 to prevent leakage at the interface between the cone 134 and cone 56. The resilient cone seal 150 and opening 146 have diameters which are larger than the diameter of the seal chamber 112. By way of example of these cone seals, reference is made to the Schulte Patent, the Pfiefler Patent, and to the U.S. Patent Applications of Albert and Dean and of Seehausen.

The horizontal wall 136 of the bell-shaped female connector member 130 is connected to an inner cylindrical wall 152 of the running tool 132 by a bolt 154. The cylindrical wall 152 has an internal bore 156 of a suitable diameter to fit closely over the mandrel 12 and has a plurality of openings 160 to receive radially moveable locking dogs 162 which are urged into engagement with suitable locking grooves 164 located on the outer surface near the top of the mandrel 12 to lock the running tool 132 on the mandrel and hold the cones 134 and 56 in sealing engagement. In addition to the cylindrical wall 152, the running tool 132 also has a horizontal wall 166 on which is located a hydraulic cylinder 170 whose piston rod 172 is connected to a camming ring 174 for urging and retracting the locking dogs 162. Any number of prior art patents in this field indicate how the locking dog/hydraulic cylinder and ring combination operate. See, for example, the Ahlstone Patent.

The lower end of the bell-shaped female connector member 130 is connected by bolt 180 to a guide ring 182 and cover 184. The guide ring 182 has a lower downwardly facing surface 186 and the cover 184 extends back to the horizontal wall 190 of the running tool 132. The guide ring 182 aids in landing the running tool 132 onto the cone seal manifold 14.

As will be apparent to those skilled in the art, this female connector member 130 and the seal cone manifold 14 form a connector and the interfacing cone seal valves normally found between mating cone seal surfaces such as shown in the Seehausen Application are eliminated.

It will also be apparent to those skilled in the art that the female connector member 130 and the cone seal manifold 14 are useful for any type of remote control device that requires access from a hydraulic supply since it provides access from two locations to operate a single function. This technique may be used in conjunction with control pods, such on BOP stacks.

It should be apparent to those skilled in the art, that one of the important features of this invention is the "fail safe" of the shuttle valve 66, i.e., pressure from the subsea umbilical 44 will automatically move the shuttle valve 66 to the up position, providing control from the subsea umbilical 44 without the aid of the spring 82. Still another important feature of this invention is that vertical hydraulic access is guaranteed with the landing of the running tool without any external mechanical means.

We claim:

1. In a subsea tree having valve actuators actuated by hydraulic fluid to control the flow of oil or gas from a well, to connect the tree to the well and flow lines, etc, from a remote source of fluid under pressure directed to the tree in two paths, the improvement comprising:
    a cone seal manifold having a first cone surface and positioned on the tree for controlling and directing the flow of said hydraulic fluid from either path to the valve actuators, said control manifold including,
    a plurality of shuttle type valves in vertical bores,
    said shuttle valves in one position connecting a subsea umbilical to the valve actuators,
    said shuttle valves in a second position connecting surface controlled fluid pressure to the valve actuators and disconnecting said subsea umbilical from said valve actuators,
    said shuttle valves partly extending above a top surface of said subsea manifold and subject to engagement by a bell shaped female connector on a running tool means to move said shuttle valves from said one position to said second position.

2. The subsea tree as claimed in claim 1 wherein said subsea cone seal manifold has passages formed in said first cone surface through which surface controlled fluid pressure is communicated to said valve actuators.

3. The subsea tree as claimed in claim 2 wherein said bell-shaped female connector has a second cone surface and with fluid passageways through said second cone surface to direct surface fluid pressure through said first cone surface.

4. The subsea tree as claimed in claim 3 wherein said second cone surface includes sealing means engageable with said first cone surface to prevent leakage between said cone surfaces.

5. The subsea tree as claimed in claim 4 wherein passageways in said first cone surface include means for closing said passageways against sea water intrusion when said shuttle valves are in one said position and which passageways are opened by fluid pressure directed through said second cone surface.

6. The subsea tree as claimed in claim 5 wherein said running tool removeably connects said bell-shaped female connector onto said tree.

7. The subsea tree as claimed in claim 1 wherein said shuttle valves are spring biased toward said one position.

8. The subsea tree as claimed in claim 7 further including metallic valve seats engageable by said shuttle valves thereby forming metal-to-metal seals when said shuttle valves are in one said position.

9. In a system for the production of oil or gas from a subsea well, including a completion tree having valve actuators operated by hydraulic fluid to control the flow of oil or gas from the well from a remote source of hydraulic fluid under pressure directed to said tree in two paths for different operational scenarios, the improvement comprising:
    a cone seal manifold having a first cone formed thereon as part of said tree for controlling and directing the flow of hydraulic fluid from either path to the valve actuators, said cone seal manifold including,
    a plurality of bores in said cone seal manifold,
    a shuttle valve in each of said bores and moveable from a first position to a second position,
    said shuttle valves having means cooperating with said bores to form valve chambers,
    first passageways connecting said valve chambers to one path of hydraulic fluid under pressure,
    second passageways connecting said valve chambers to said valve actuators,
    said shuttle valves in said one position opening said valve chambers so that fluid under pressure may flow from said first passageways to said second passageways,
    spaced apart seal means on said shuttle valves, said spaced apart seal means cooperating with said bores to form a plurality of second valve chambers,
    third passageways for connecting said second chambers to said second path of hydraulic fluid under pressure,
    said third passageways opening into said first cone and connectable to said second passageways when said shuttle valves are moved to said second position thereby closing said first passageways.

10. The system as claimed in claim 9 further including a bell-shaped connector having a second cone engageable with said first cone and means engageable with said shuttle valves to move said shuttle valves to said second position.

11. The system as claimed in claim 10 wherein said bell-shaped connector has fifth passageways connected to said second path of hydraulic fluid under pressure to direct said hydraulic fluid under pressure through the interface between said cone surfaces to said third passageways.

12. The system as claimed in claim 11 wherein said bell-shaped connector is part of a running tool lowered to the tree from the water surface and which has means for detachably connecting said bell-shaped female connector to said tree.

13. Male and female connector members for connecting valve actuators operated by hydraulic fluid to perform a function from a remote source of hydraulic fluid under pressure directed to said connector members in two different paths, the improvement comprising, a first cone formed on said male connector member for controlling and directing the flow of hydraulic fluid from either path to the valve actuators, said male connector including, a plurality of bores in said male connector member, a shuttle valve in each of said bores and moveable from a first position to a second position, said shuttle valves having means cooperating with said bores to form valve chambers, first passageways connecting said valve chambers to one path, second passageways connecting said valve chambers to said valve actuators, said shuttle valves in said one position opening said valve chambers so that fluid under pressure may flow from said first passageways to said second passageways, spaced apart seal means on said shuttle valves, said spaced apart means cooperating with said bores to form a plurality of second valve chambers, third passageways for connecting said second chambers to said second path, said third passageways opening into said first cone and connectable to said second passageways when said shuttle valves are moved to said second position thereby closing said first passageways.

14. The connector members as claimed in claim 13 wherein said female connector member is bell-shaped having a second cone engageable with said first cone and means engageable with said shuttle valves to move said shuttle valves to said second position.

15. The connector members as claimed in claim 14 wherein said female connector member has fifth passageways connected to said second path to direct hydraulic fluid under pressure through the interface between said cones to said third passageways.

* * * * *